(12) United States Patent
Benea et al.

(10) Patent No.: US 12,052,466 B2
(45) Date of Patent: *Jul. 30, 2024

(54) AUTOMATIC TRANSITION OF CONTENT BASED ON FACIAL RECOGNITION

(71) Applicant: Google LLC, Mountain View, CA (US)

(72) Inventors: Robert Benea, San Jose, CA (US); Andrej Cedilnik, Oakland, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,997

(22) Filed: Apr. 5, 2023

(65) Prior Publication Data

US 2023/0254536 A1 Aug. 10, 2023

Related U.S. Application Data

(63) Continuation of application No. 17/889,732, filed on Aug. 17, 2022, now Pat. No. 11,659,240, which is a
(Continued)

(51) Int. Cl.
*H04N 21/442* (2011.01)
*G06V 40/16* (2022.01)
*H04H 60/33* (2008.01)
*H04H 60/40* (2008.01)
*H04H 60/45* (2008.01)
*H04N 21/4223* (2011.01)
*H04N 21/44* (2011.01)
*H04N 21/4415* (2011.01)
*H04N 21/45* (2011.01)
(Continued)

(52) U.S. Cl.
CPC ....... *H04N 21/44218* (2013.01); *G06V 40/16* (2022.01); *G06V 40/168* (2022.01); *G06V 40/172* (2022.01); *H04H 60/33* (2013.01); *H04H 60/40* (2013.01); *H04H 60/45* (2013.01); *H04N 21/4223* (2013.01); *H04N 21/44008* (2013.01); *H04N 21/4415* (2013.01); *H04N 21/4532* (2013.01); *H04N 21/458* (2013.01); *H04N 21/6587* (2013.01); *H04N 21/8456* (2013.01)

(58) Field of Classification Search
CPC .... G06V 40/16; G06V 40/168; G06V 40/172; H04H 60/33; H04H 60/40; H04H 60/45; H04N 21/4223; H04N 21/44008; H04N 21/4415; H04N 21/44218; H04N 21/4532; H04N 21/458; H04N 21/6587; H04N 21/8456
See application file for complete search history.

(56) References Cited

U.S. PATENT DOCUMENTS 7,375,731 B2 * 5/2008 Divakaran ............ G06F 16/785
345/581
7,606,425 B2 * 10/2009 Bazakos .......... G08B 13/19641
714/26
(Continued)

*Primary Examiner* — Michael B. Pierorazio
(74) *Attorney, Agent, or Firm* — Kilpatrick Townsend & Stockton LLP

(57) ABSTRACT

Methods and systems for automatically transitioning content based on facial recognition, wherein the method may include receiving a signal from a camera, identifying a face of a viewer within an area, retrieving a user identifier associated with the face of the viewer, selecting a program, and displaying the program.

20 Claims, 12 Drawing Sheets

Related U.S. Application Data continuation of application No. 17/238,559, filed on Apr. 23, 2021, now Pat. No. 11,457,276, which is a continuation of application No. 16/730,135, filed on Dec. 30, 2019, now Pat. No. 10,992,986, which is a continuation of application No. 16/377,775, filed on Apr. 8, 2019, now Pat. No. 10,524,006, which is a continuation of application No. 16/017,517, filed on Jun. 25, 2018, now Pat. No. 10,257,571, which is a continuation of application No. 15/700,434, filed on Sep. 11, 2017, now Pat. No. 10,009,649, which is a continuation of application No. 15/369,439, filed on Dec. 5, 2016, now Pat. No. 9,762,959, which is a continuation of application No. 14/932,706, filed on Nov. 4, 2015, now Pat. No. 9,516,380, which is a continuation of application No. 14/595,762, filed on Jan. 13, 2015, now Pat. No. 9,226,024, which is a continuation of application No. 13/602,914, filed on Sep. 4, 2012, now Pat. No. 8,965,170.

(51) Int. Cl.
*H04N 21/458* (2011.01)
*H04N 21/6587* (2011.01)
*H04N 21/845* (2011.01)

(56) References Cited

U.S. PATENT DOCUMENTS

| | | | |
|---|---|---|---|
| 8,208,694 B2 * | 6/2012 | Jelonek | H04N 21/25891 382/209 |
| 8,965,170 B1 | 2/2015 | Benea et al. | |
| 9,226,024 B2 | 12/2015 | Benea et al. | |
| 9,516,380 B2 | 12/2016 | Benea et al. | |
| 9,762,959 B2 | 3/2017 | Benea et al. | |
| 10,009,649 B2 | 6/2018 | Benea et al. | |
| 10,257,571 B2 * | 4/2019 | Benea | G06V 40/172 |
| 10,524,006 B2 * | 12/2019 | Benea | H04H 60/33 |
| 10,992,986 B2 * | 4/2021 | Benea | H04H 60/40 |
| 11,457,276 B2 * | 9/2022 | Benea | G06V 40/168 |
| 11,659,240 B2 * | 5/2023 | Benea | H04N 21/44218 725/12 |
| 2002/0184098 A1 * | 12/2002 | Giraud | G06V 40/165 705/14.66 |
| 2002/0186867 A1 * | 12/2002 | Gutta | G06F 16/40 382/116 |
| 2005/0080671 A1 * | 4/2005 | Giraud | G06V 40/165 705/14.66 |
| 2005/0086069 A1 * | 4/2005 | Watson | H04N 21/4755 726/3 |
| 2005/0281531 A1 | 12/2005 | Unmehopa | |
| 2006/0053342 A1 * | 3/2006 | Bazakos | G08B 13/19682 714/37 |
| 2006/0110136 A1 * | 5/2006 | Abecassis | H04N 21/47 348/E7.071 |
| 2006/0161621 A1 | 7/2006 | Rosenberg | |
| 2008/0002892 A1 * | 1/2008 | Jelonek | H04N 21/25891 707/E17.026 |
| 2008/0299893 A1 | 12/2008 | Park | |
| 2009/0116695 A1 * | 5/2009 | Anchyshkin | G06V 40/16 382/106 |
| 2009/0133051 A1 * | 5/2009 | Hildreth | H04N 21/42204 725/28 |
| 2009/0196464 A1 * | 8/2009 | Dimitrova | G06V 10/764 382/118 |
| 2009/0210902 A1 * | 8/2009 | Slaney | H04N 21/4223 725/34 |
| 2009/0217315 A1 * | 8/2009 | Malik | H04N 7/181 725/9 |
| 2009/0285454 A1 * | 11/2009 | Xu | H04N 21/44218 382/118 |
| 2010/0007726 A1 * | 1/2010 | Barbieri | G06V 40/193 348/78 |
| 2010/0008547 A1 * | 1/2010 | Yagnik | G06F 18/28 382/118 |
| 2010/0067745 A1 * | 3/2010 | Kovtun | G06V 20/40 382/106 |
| 2010/0141787 A1 * | 6/2010 | Bigioi | G06V 40/161 348/222.1 |
| 2010/0299210 A1 * | 11/2010 | Giraud | G06V 40/165 705/14.66 |
| 2011/0043602 A1 | 2/2011 | Lee | |
| 2011/0052012 A1 * | 3/2011 | Bambha | G06V 40/16 382/118 |
| 2011/0058787 A1 | 3/2011 | Hamada | |
| 2011/0129126 A1 * | 6/2011 | Begeja | G06F 16/784 382/118 |
| 2011/0131502 A1 | 6/2011 | Ryu et al. | |
| 2011/0150295 A1 * | 6/2011 | Eckhoff | G06Q 30/02 382/118 |
| 2011/0150296 A1 * | 6/2011 | Eckhoff | G06Q 30/02 382/118 |
| 2011/0150297 A1 * | 6/2011 | Eckhoff | G06V 40/172 382/118 |
| 2011/0150298 A1 * | 6/2011 | Eckhoff | G06Q 30/02 382/118 |
| 2011/0150299 A1 * | 6/2011 | Eckhoff | G06Q 30/02 382/118 |
| 2011/0161998 A1 | 6/2011 | Alberth et al. | |
| 2011/0231757 A1 * | 9/2011 | Haddick | H04N 23/55 715/702 |
| 2012/0072936 A1 * | 3/2012 | Small | G06Q 30/00 725/10 |
| 2013/0036011 A1 * | 2/2013 | Roberts | H04N 21/4223 705/14.58 |

* cited by examiner

AUTOMATIC TRANSITION OF CONTENT BASED ON FACIAL RECOGNITION

CROSS-REFERENCE TO RELATED APPLICATIONS

This application is a continuation of U.S. patent application Ser. No. 17/889,732, filed Aug. 17, 2022, which is a continuation of U.S. patent application Ser. No. 17/238,559, filed Apr. 23, 2021, which is a continuation of U.S. patent application Ser. No. 16/730,135, filed Dec. 30, 2019, which is a continuation of U.S. patent application Ser. No. 16/377,775, filed Apr. 8, 2019, which is a continuation of U.S. patent application Ser. No. 16/017,517, filed Jun. 25, 2018, which is a continuation of U.S. patent application Ser. No. 15/700,434, filed Sep. 11, 2017, which is a continuation of U.S. patent application Ser. No. 15/369,439, filed Dec. 5, 2016, which is a continuation of U.S. patent application Ser. No. 14/932,706, filed Nov. 4, 2015, which is a continuation of U.S. patent application Ser. No. 14/595,762, filed Jan. 13, 2015, which is a continuation of U.S. patent application Ser. No. 13/602,914, filed Sep. 4, 2012, each of which is hereby incorporated by reference herein in its entirety.

BACKGROUND

The present disclosure relates generally to systems and methods for providing content for display and more particularly, to automatically transitioning content based on facial recognition.

SUMMARY

In one implementation, in general, a computer-implemented method may include receiving a signal from a camera. The method may also include identifying a face of a viewer within an area. The method may further include retrieving a user identifier associated with the face of the viewer. The method may also include selecting a program from a plurality of programs based on the user identifier. The method may include displaying the program.

In another implementation, in general, a system for selecting a program for playback based on facial recognition of a viewer may include a camera configured to capture an image of an area. The system may also include a processing circuit. The processing circuit may be configured to receive a signal from the camera. The processing circuit may also be configured to identify a face of a viewer within the area. The processing circuit may be configured to retrieve a user identifier associated with the face of the viewer. The processing may be configured to select a program from a plurality of programs based on the user identifier. The processing circuit may also be configured to display the program.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Content is available in many locations and on a variety of devices. In some implementations, content is delivered through cloud-based applications, such as a web browser, mobile application, light weight desktop, and so forth. With the proliferation of content and delivery channels, it may be expensive to consume content on a number of devices, e.g., the setup of each device to receive the content may be unduly and time consuming.

For example, the user may be half way through an online movie rental on a television in one room, but may want to continue the movie in another room. Typically, the user has to turn on the television in the room that the user wants to view the content. The user also has to navigate through an interface in order to locate the content. The user may be required to authenticate the new device and/or provide login credentials to a service. The user may also have to find the location within the content that the user had stopped watching. Then, the user can continue viewing the content.

The system described herein may record a session identifier, a user identifier, and other relevant information to associate with facial recognition data. In some implementations, instead of playing the content, the system may tune to the channel that the user was previously viewing on a different device. The system may not require user action to provide the content.

The system allows content to follow the user. The system may be based on image recognition with a camera mounted on devices. The system may use facial recognition to identify the user and to seamlessly transition the content from one device to another.

Heuristics may be used to identify collisions, such as when two or more people are present. The system may detect and recognize one or multiple faces watching the same device and associate additional information related to the current program played on the device. The information may be used to create a seamless experience while changing between different devices. The detection and recognition may be based on computer vision algorithms (e.g., Eigenfaces, Principal Component Analysis, Fisherfaces, etc.). Similarly, the additional data associated to each face may include content information related to the program being watched. Additional data may include, but is not limited to, source information, availability, price, language, etc.

In an example, the user may be viewing content on a device while in the kitchen. The camera on the device in the kitchen may be tracking the user while s/he is preparing snacks. When the user enters the living room, the camera on the device in the living room identifies the user and the system determines that the user is in the middle of watching the show. If no one else is currently watching the device in the living room, the device may automatically start playing the content that the device in the kitchen was playing. The kitchen device may eventually stop playing the content.

Figure 1:
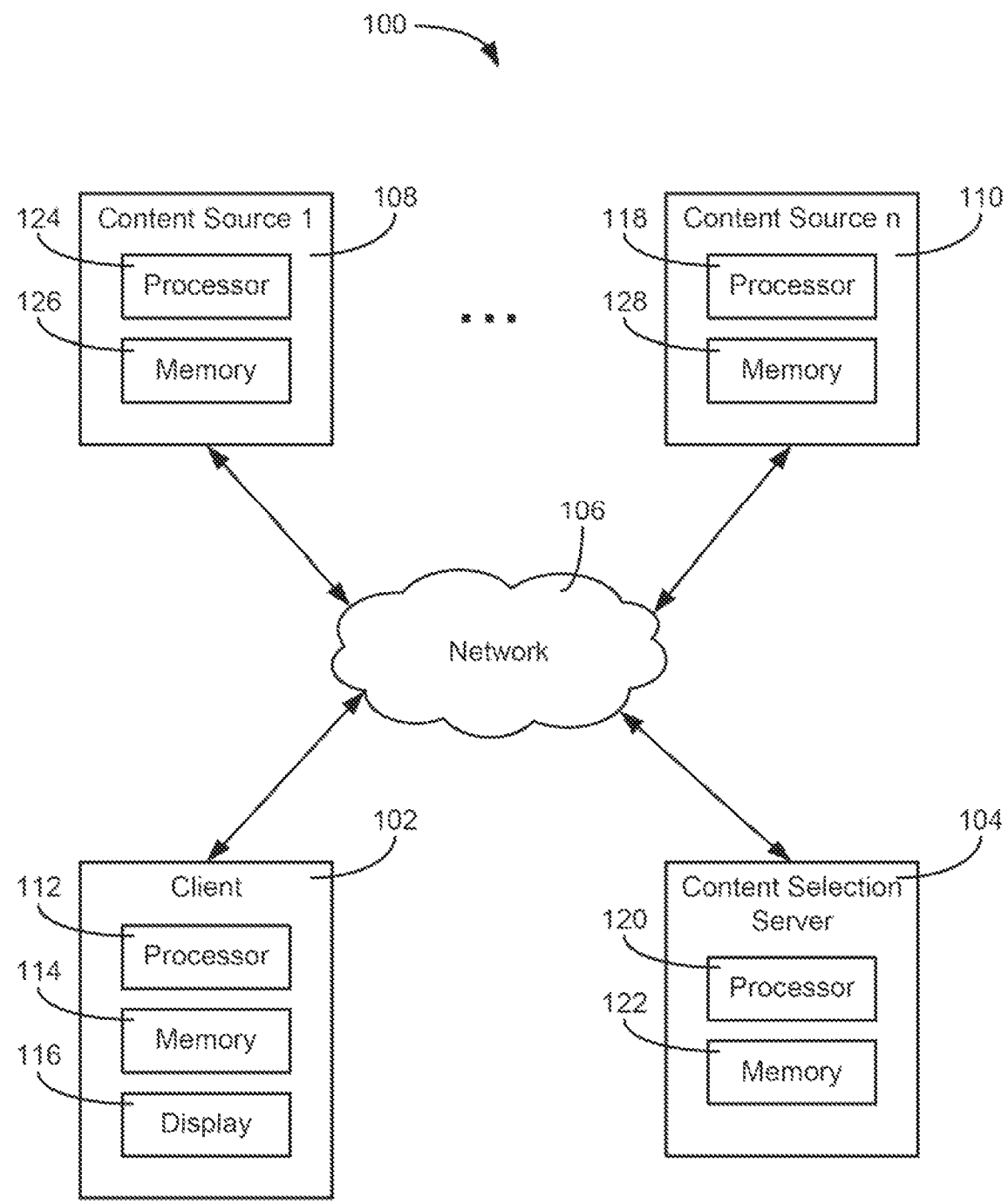
FIG. 1 is an example of a block diagram of a computer system in accordance with a described implementation.

FIG. 1 is a block diagram of a computer system 100 in accordance with a described implementation. System 100 includes client 102, which may communicate with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to client 102. System 100 may include a content selection server 104, which provides content to other computing devices over network 106.

Network 106 may be any form of computer network that relays information between client 102, content selection server 104, and content sources 108, 110. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C #, Java, JavaScript, Perl, Python and Visual Basic.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from content selection server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, content selection server 104 may include a processing circuit including a processor 120 and a memory 122. In some implementations, content selection server 104 may include several computing devices (e.g., a data center, a network of servers, etc.). In such a case, the various devices of content selection server 104 may comprise a processing circuit (e.g., processor 120 represents the collective processors of the devices and memory 122 represents the collective memories of the devices).

Content selection server 104 may provide content to client 102 via network 106. For example, content source 108 may provide a webpage to client 102, in response to receiving a request for a webpage from client 102. In some implementations, content from content selection server 104 may be provided to client 102 indirectly. For example, content source 108 may receive content from content selection server 104 and use the content as part of the webpage data provided to client 102. In other implementations, content from content selection server 104 may be provided to client 102 directly. For example, content source 108 may provide webpage data to client 102 that includes a command to retrieve content from content selection server 104. On receipt of the webpage data, client 102 may retrieve content from content selection server 104 based on the command and display the content when the webpage is rendered on display 116.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Figure 2A:
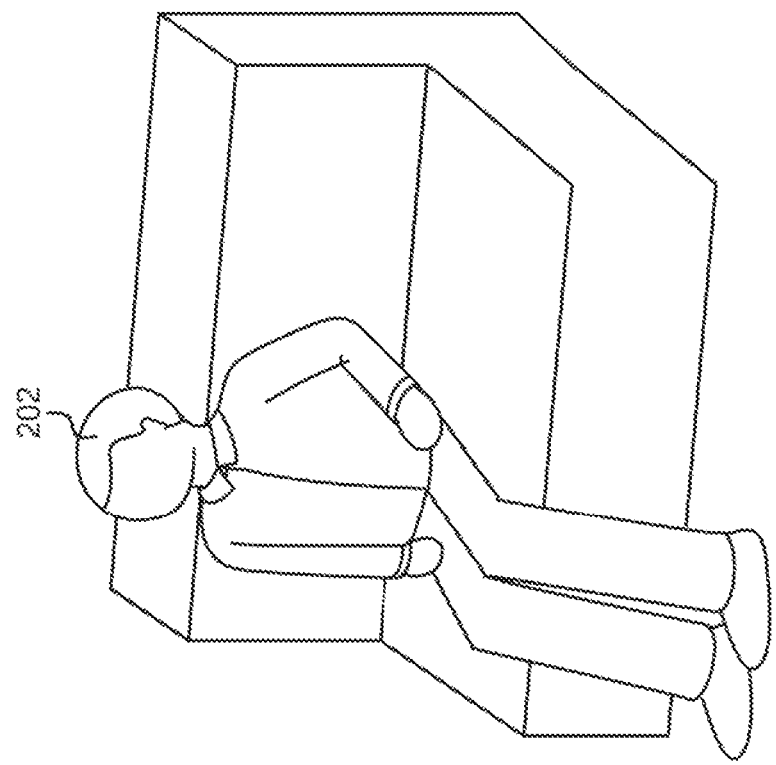
FIGS. 2A-2C are examples of an illustration of transitioning content based on facial recognition of the user in accordance with a described implementation.
Figure 2A:
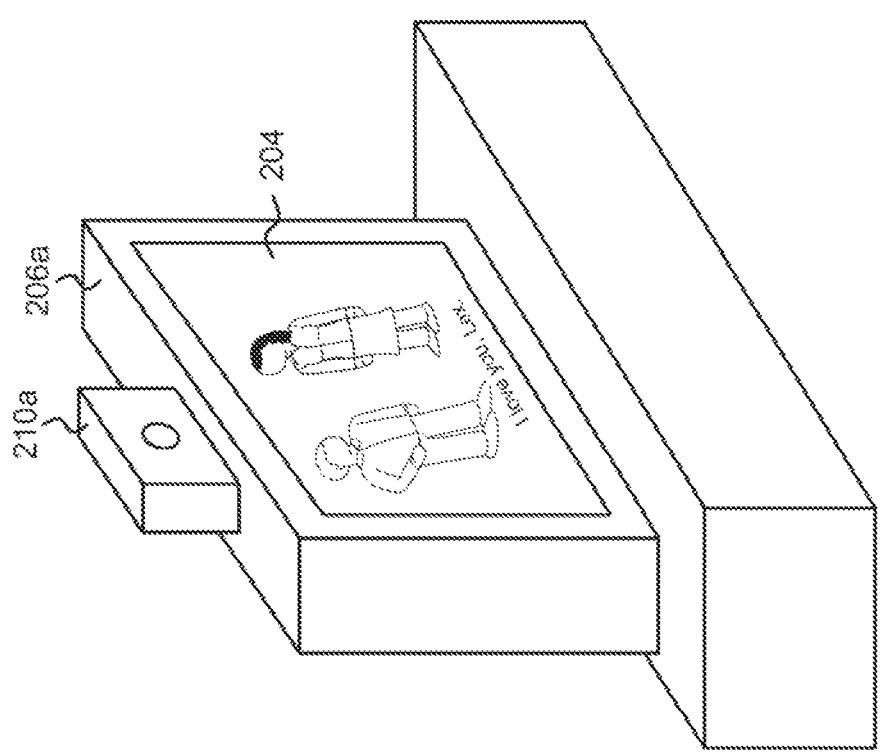
Figure 2B:
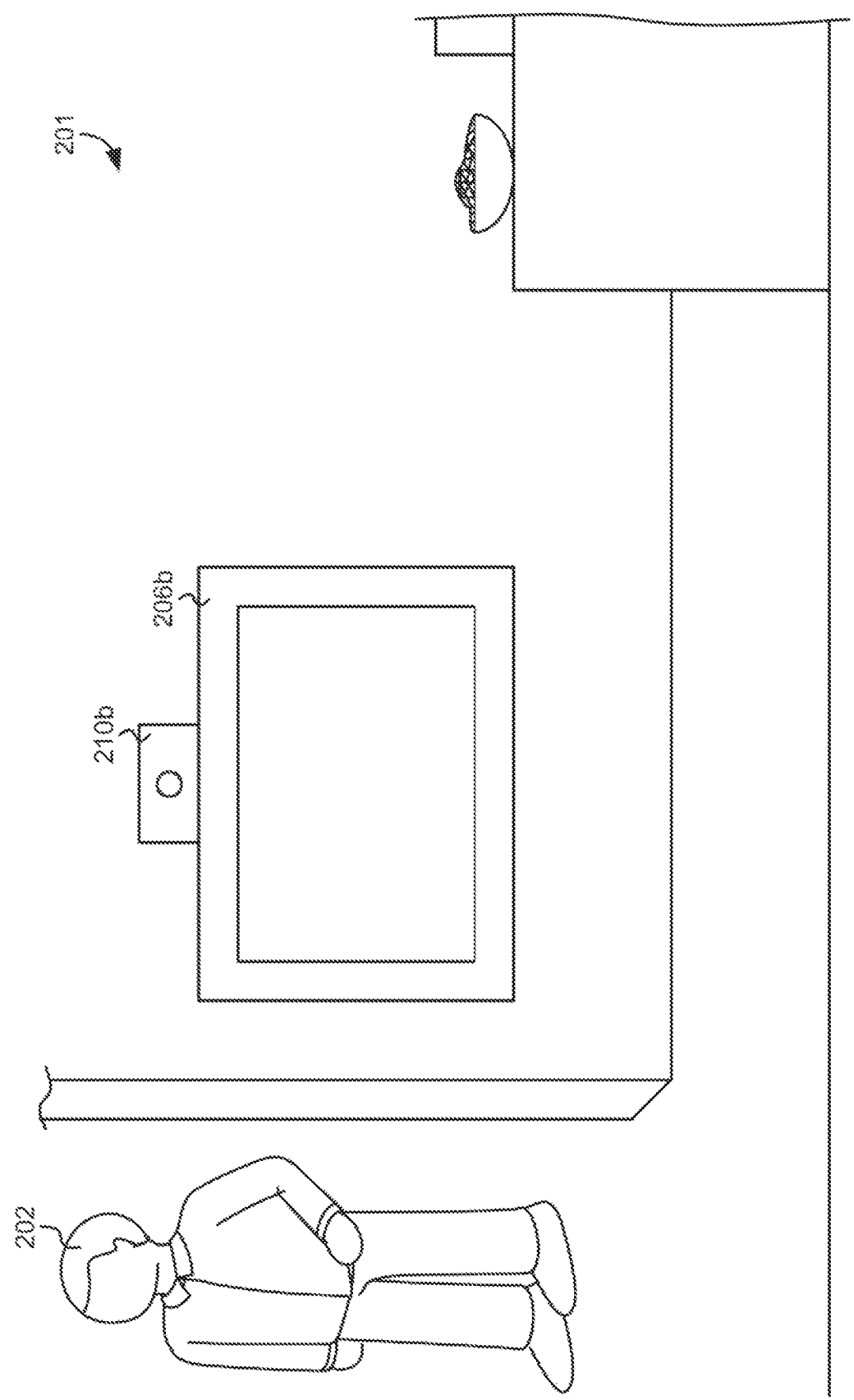
Figure 2C:
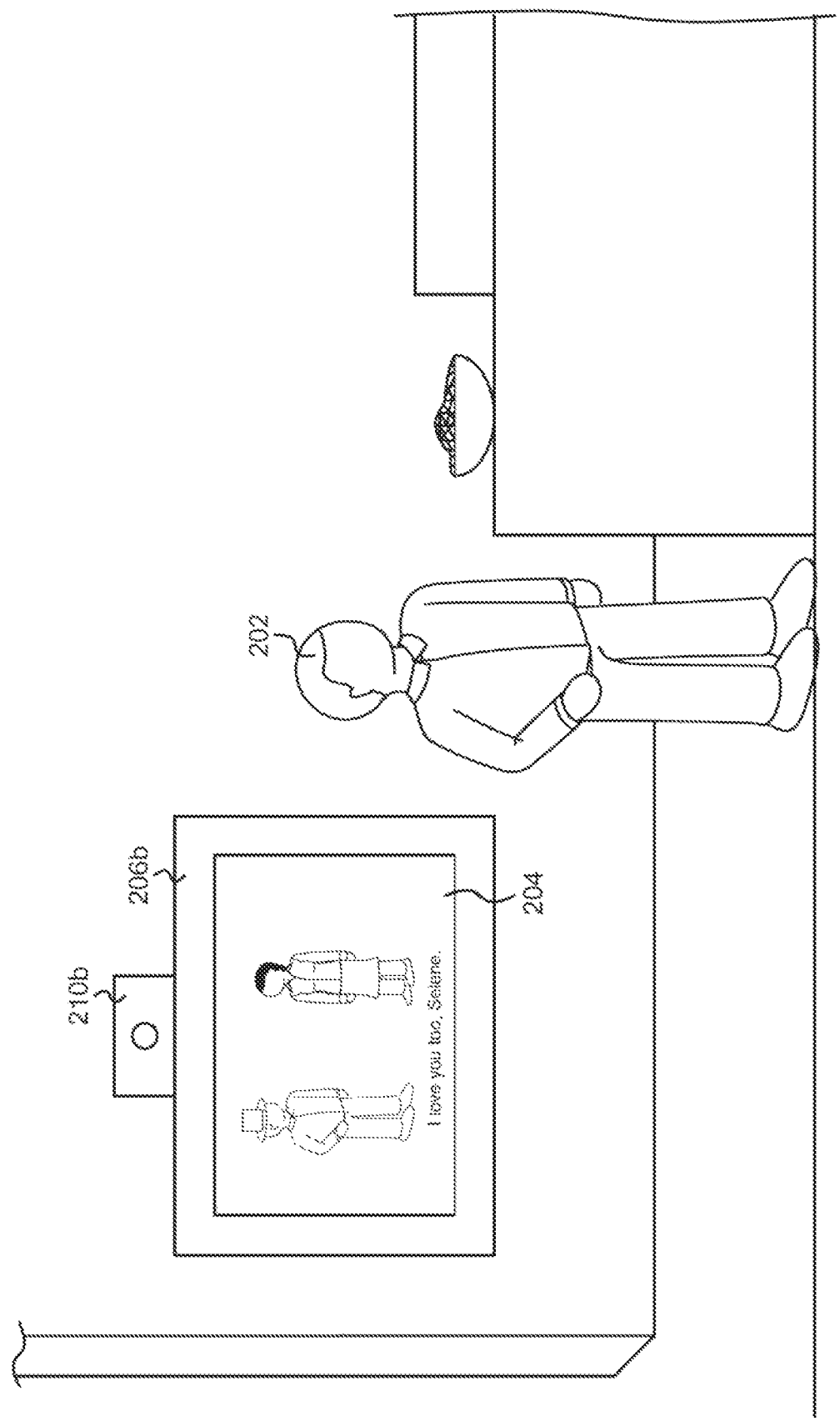

FIGS. 2A-2C are examples of an illustration of transitioning content based on facial recognition of the user in accordance with a described implementation. In FIG. 2A, viewer 202 may view content 204 provided by device 206a. As used herein, viewing may include visual, audio, tactile, or any other forms of interaction of a client device or viewer with content. Content 204 may include, but is not limited to, articles, discussion threads, messages, music, video, graphics, search results, web pages, information/news feeds, etc. Content 204 may include many types of content, such as text, graphics, audio, video, tactile, or combinations of these. Content 204 may be provided by devices 206a, 206c.

Devices 206a, 206c may include all formats for providing content. For example, devices 206a, 206c may include monitors, screens, panels, speakers, etc. which may be integrated with or connected to a mobile device (e.g., smartphone), computer (e.g., laptop, desktop, workstation, tablet, etc.), personal digital assistant, television receiver, game console, GPS device, etc.

Devices 206a, 206c may be located in a variety of places such as, but not limited to, the viewer's person (e.g., smartphone), a viewer's room (e.g., viewer's bedroom), an outdoor public area (e.g., a public patio), an indoor public area (e.g., a tavern) or any other place that is appropriate for device 206.

Devices 206a, 206c may include component 210. Component 210 may have the ability to reproduce an actual object, i.e., capture an image. For example, component 210 may be an imaging device such as a digital camera, digital movie camera, etc. Component 210 may be a stand-alone device or may be integrated with devices 206a, 206c, such as a webcam. Component 210 may include functionality to allow viewer 202 to enter content to associate with an image. For example, component 210 may capture the face of viewer 202 as an image and viewer 202 may want to associate additional content with the image. For example, viewer 202 may dictate notes about the image or programming associated with the image. In another example, viewer 202 may also enter textual data to associate with the image, such as date, time, location, etc.

Component 210 may store the image in any format that allows for image data, textual data, and any other appropriate data associated with the image. Component 210 may be part of a larger system that may receive and catalogue images, analyze and identify the images (e.g., distinguish one viewer from another), search for information related to the image, etc. The system may include repositories, libraries, etc. to store images and related information. The data repositories may be implemented using a variety of data structures, such as a hash table, an array, a database, etc. In some implementations, the storage of the images and related information may be stored in a manner to protect any sensitive information, which may be determined by viewer 202 or the system.

In some implementations, the images and related information may be encrypted for privacy reasons using an encryption technique (e.g., asymmetric/symmetric key encryption, elliptic encryption, etc.) Viewer 202 may determine what information the system may use, such as how the image is used, whether to associate additional content with the image, etc.

In FIG. 2B, viewer 202 transitions away from device 206a. For example, viewer 202 leaves a first room for another room. In some implementations, viewer 202 may leave a first location for a second location. Viewer 202 may transition from device 206a, but transition back to device 206a. For example, viewer 202 may answer the telephone, component 210 detects that viewer 202 is no longer interacting with content 204, and once viewer 202 hangs up the telephone, component 210 may automatically detect interaction by viewer 202 and begin playing content 204 at the time viewer 202 answered the telephone.

In FIG. 2C, viewer 202 completes the transition away from device 206. In FIG. 2C, viewer 202 arrives in a different location 208 than device 206a and a different device 206b. However, in other implementations, viewer 202 may arrive at a different location, a different device, or another appropriate transition that allows content 204 to also transition.

As illustrated by FIG. 2C, device 206b begins to provide content 204 at the interval of time that user 202 transitioned from device 206a. For example, component 210 detected that viewer 202 was no longer interacting with device 206a. Component 210 may use image (e.g., facial) recognition to identify that viewer 202 transitioned from device 206a to device 206b. In some implementations, device 206a and 206b are the same device.

A delay may be introduced into the system for the viewer to transition from one device to another. For example, viewer 202 may have to travel from device 206a to device 206b if the devices are not located in the same location. A delay may account for the time to transition between devices 206a, 206b. The delay may be a fixed time delay based on detection of viewer 202 by component 210. In an implementation with a fixed time delay, the system may still account for additional breaks (such as going to another location, etc.) by the viewer.

If device 206a loses detection of viewer 202, then device 206a may automatically power off (e.g., power savings mode, turned off, etc.). If devices 206a, 206b both lose detection of viewer 202, then devices 206a, 206b may interrupt the play back of content 204. In this example, if viewer 202 leaves either device 206a, 206b and returns at a later time, then devices 206a, 206b may not continue the play back of content 204, but may provide an option, to the user, to play back content 204, etc.

Figure 3A:
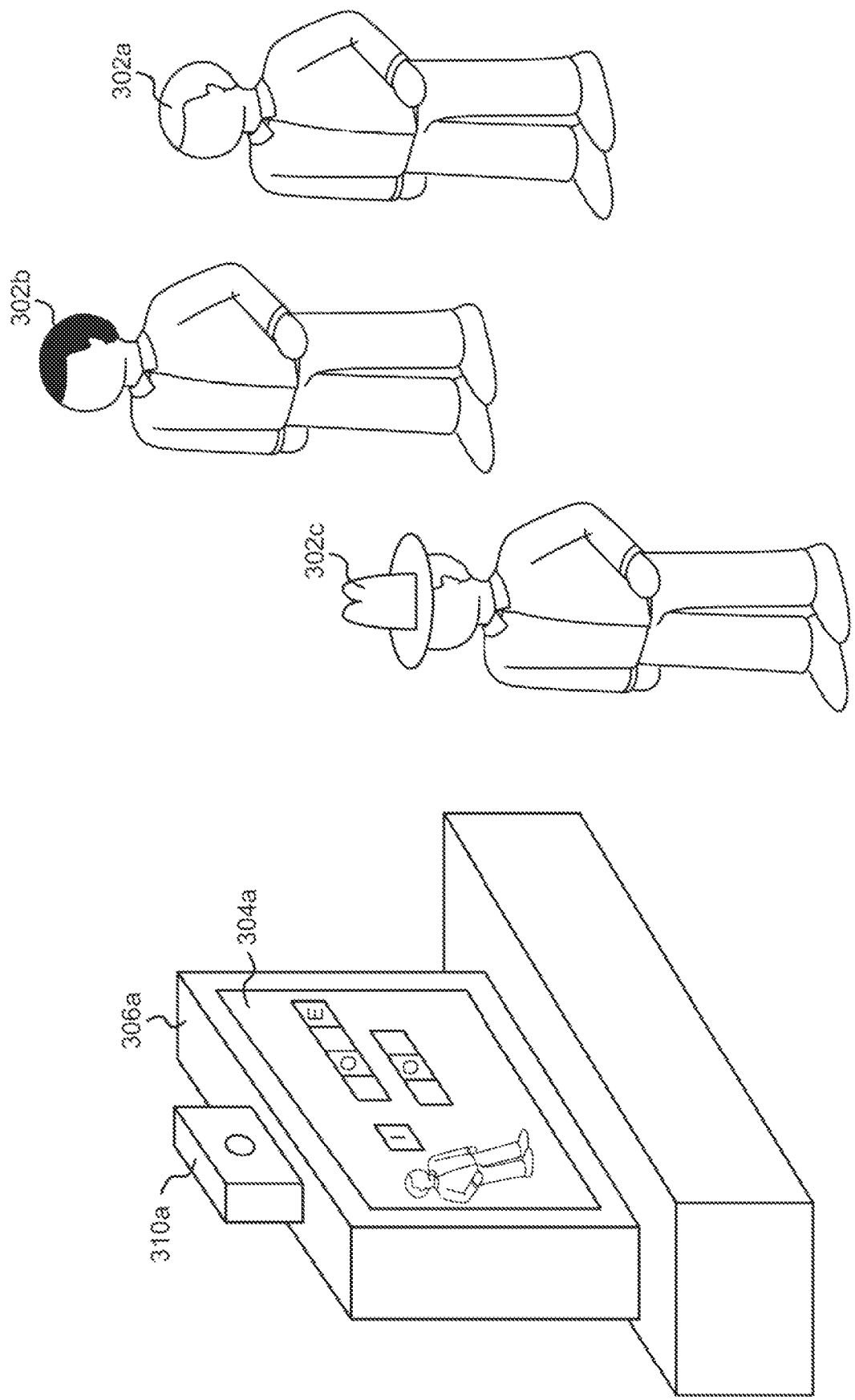
FIGS. 3A and 3B are examples of an illustration of a plurality of viewers of content in accordance with a described implementation.
Figure 3B:
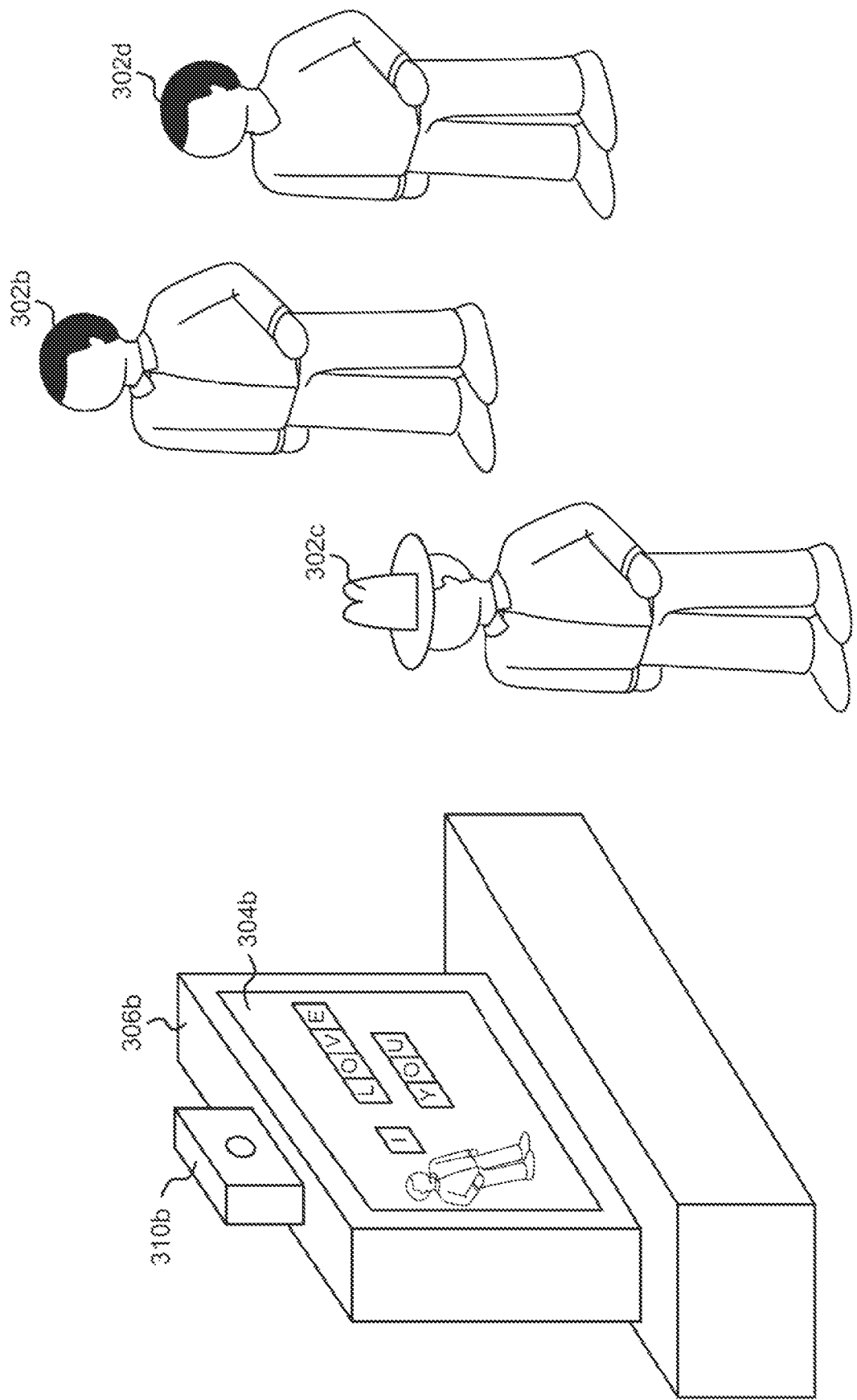

FIGS. 3A and 3B are examples of an illustration of a plurality of viewers of content in accordance with a described implementation. In FIG. 3A, a plurality of viewers 202a-202c may be interacting with content 304 on device 306. Component 310 may capture viewers 202a-202c and store the images in a repository. The images of the plurality of viewers may be subject to privacy controls. Privacy controls may include encryption of the images of the plurality of viewers to anonymize the viewers, such as removing all personally identifiable information that can be linked to the specific image (face). In addition, the images may be stored in a repository that regularly purges any sensitive or traceable data related to the viewer.

Heuristics may be applied to identify when two or more viewers are present, as illustrated by viewers 202a-202c in FIG. 3A. The heuristics may detect and recognize one or more of the multiple faces watching device 306 and associate additional information related to content 304. For example, the information may be associated with the viewer by relating the information to a unique identifier. The additional information may be used to create the content transition between different locations, different times, different devices, etc. For example, the system may detect multiple viewers and store information related to the viewers in a database. The content may transition for each of the multiple viewers.

In FIG. 3B, the plurality of viewers 202a-c interacting with content 304 has changed to viewers 202b-d. The system may recognize the faces of viewers 202b, 202c and store the point in time of content 304a in order to transition to content 304b. Viewers 202b and 202c were interacting with the same content 304a so the system transitions to content 304b. Although viewer 202d joined viewers 202b, 202c, content 304b remains with content 304b based on the majority of viewers. However, other techniques may be used to determine what content 304b device 306b shows, e.g., a threshold, a time of day, etc. If viewer 202c transitions away from content 304b, then viewer 202c may be able to continue interacting with content 304b on another device (e.g., smartphone, tablet, etc.).

Figure 4A:
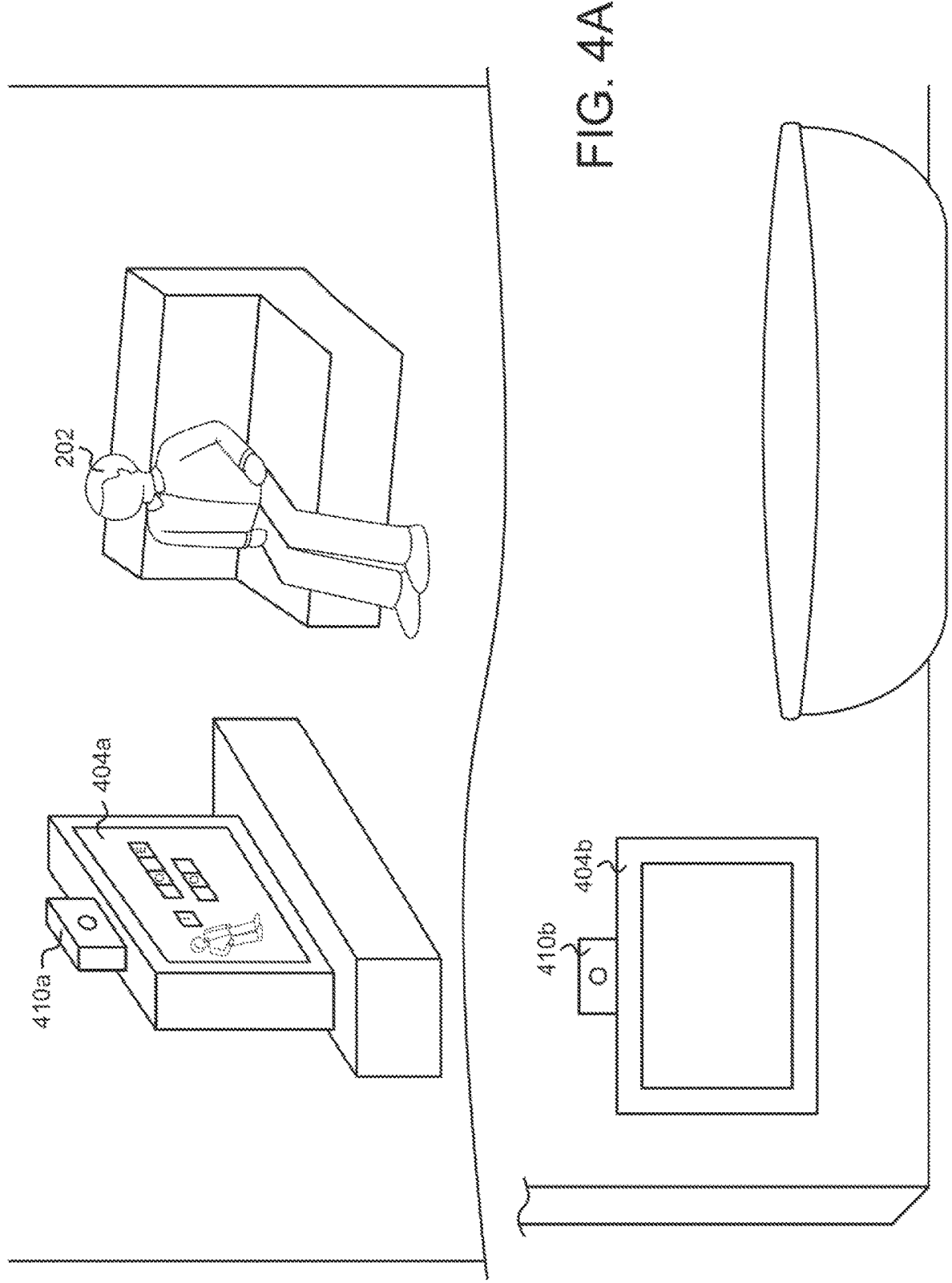
FIGS. 4A and 4B are examples of an illustration of devices in close proximity in accordance with a described implementation.
Figure 4B:
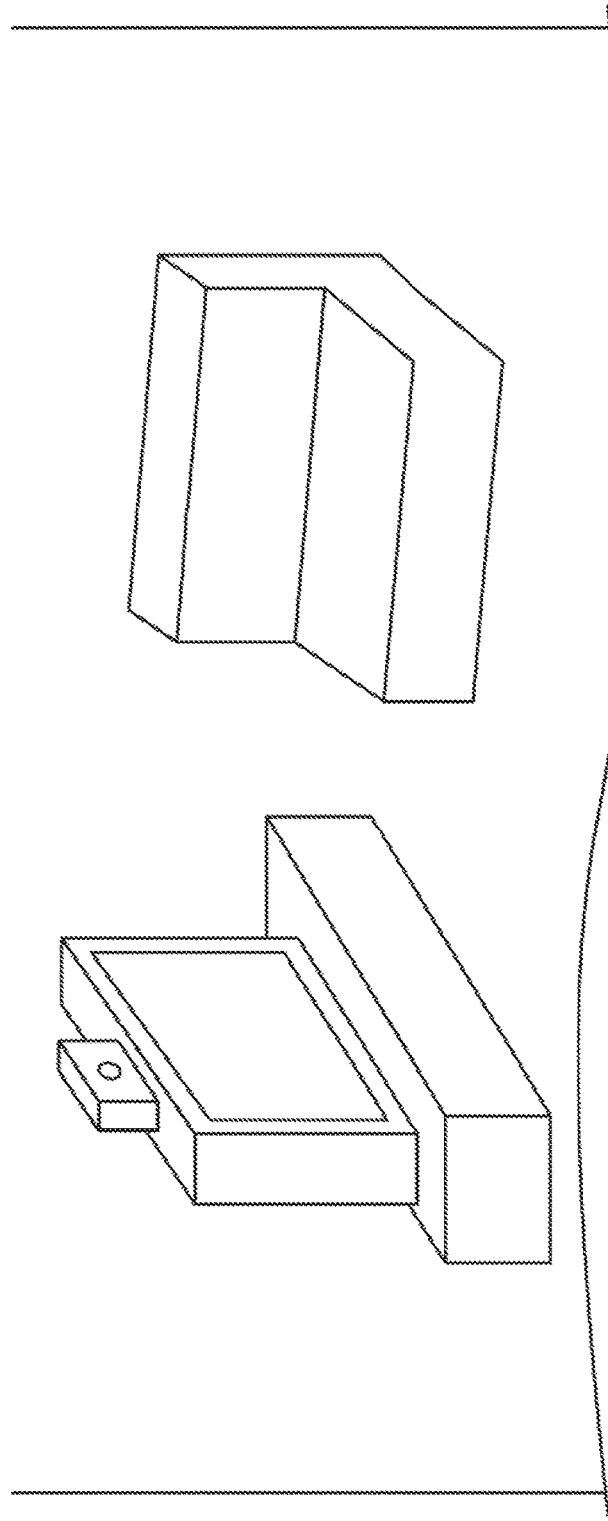
Figure 4B:
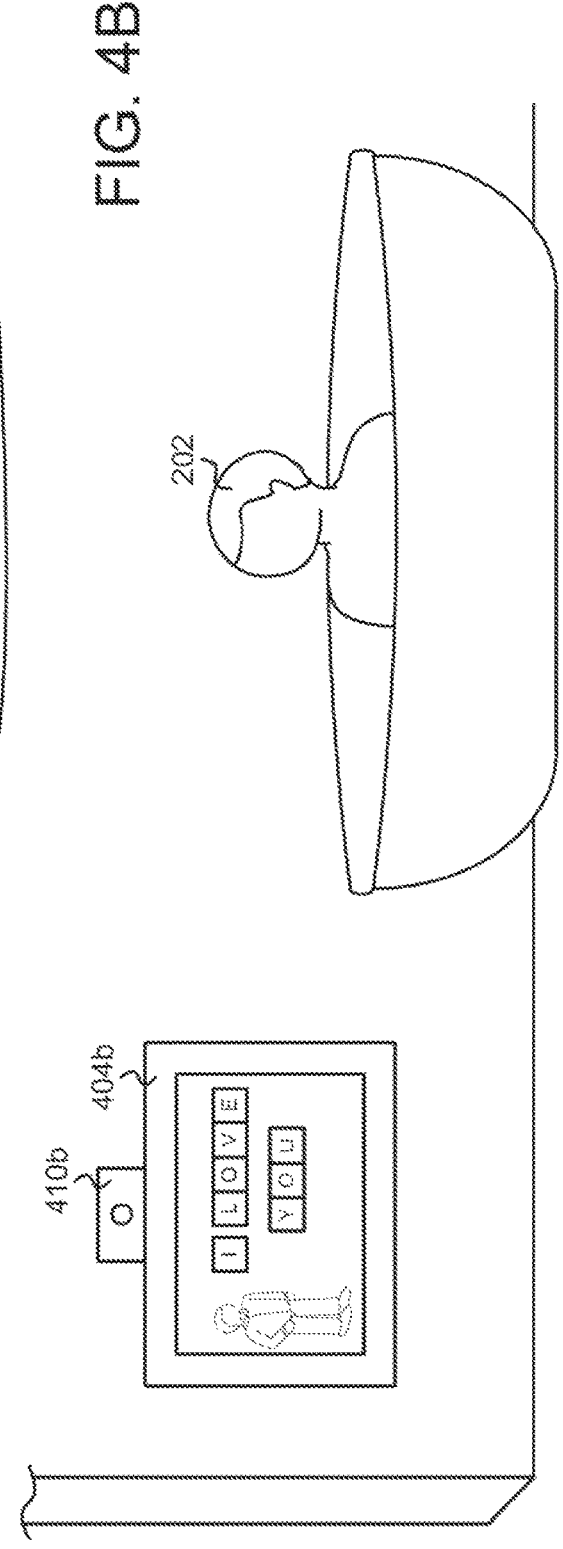

FIGS. 4A and 4B are examples of an illustration of devices in close proximity in accordance with a described implementation. In some implementations, devices 406a, 406b may be in the same location, such as the same room. In other implementations, as shown in FIGS. 4A and 4B, devices 406a, 406b are in adjacent locations. Therefore, a transition may be seamless between devices 406a, 406b. For example, devices 406a, 406b may provide content 404 in sync for a specified amount of time. Once the transition is complete, then one of devices 406a, 406b may automatically power off (e.g., turn off, power-savings mode, etc.). If viewer 202 continues to transition between devices 406a, 406b, then both devices 406a, 406b may provide content 404 in sync.

Figure 5:
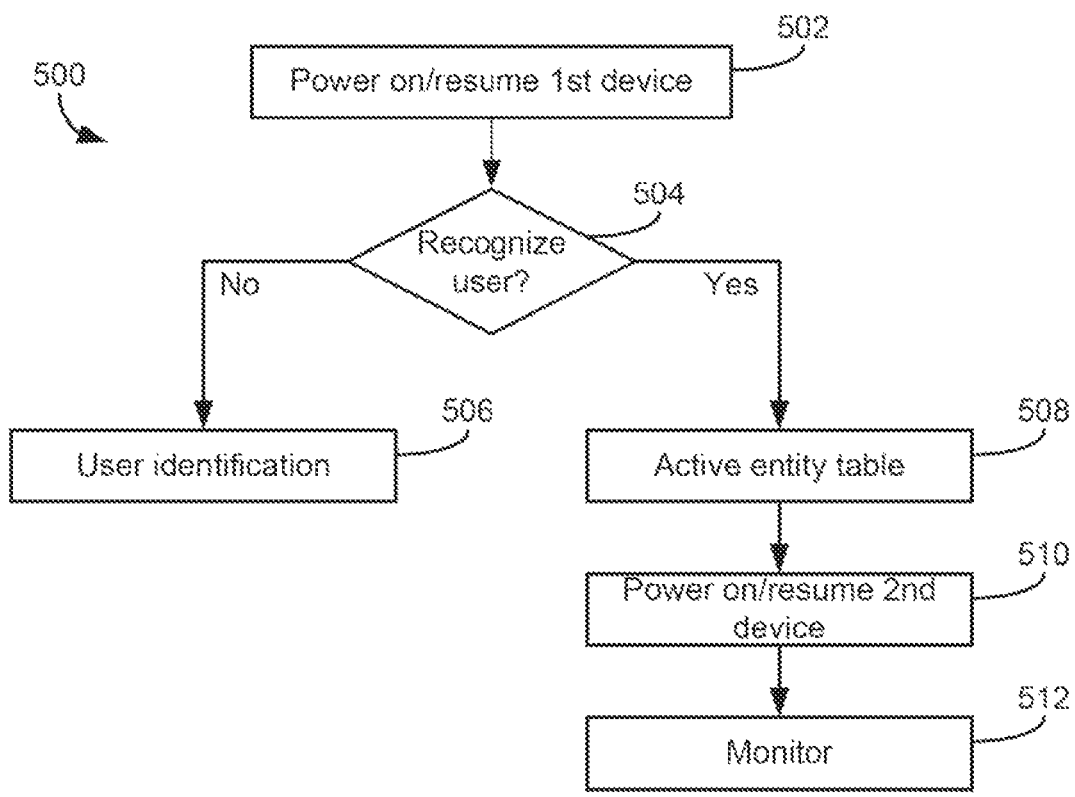
FIG. 5 is an example of a single user system in accordance with a described implementation.
Figure 6:
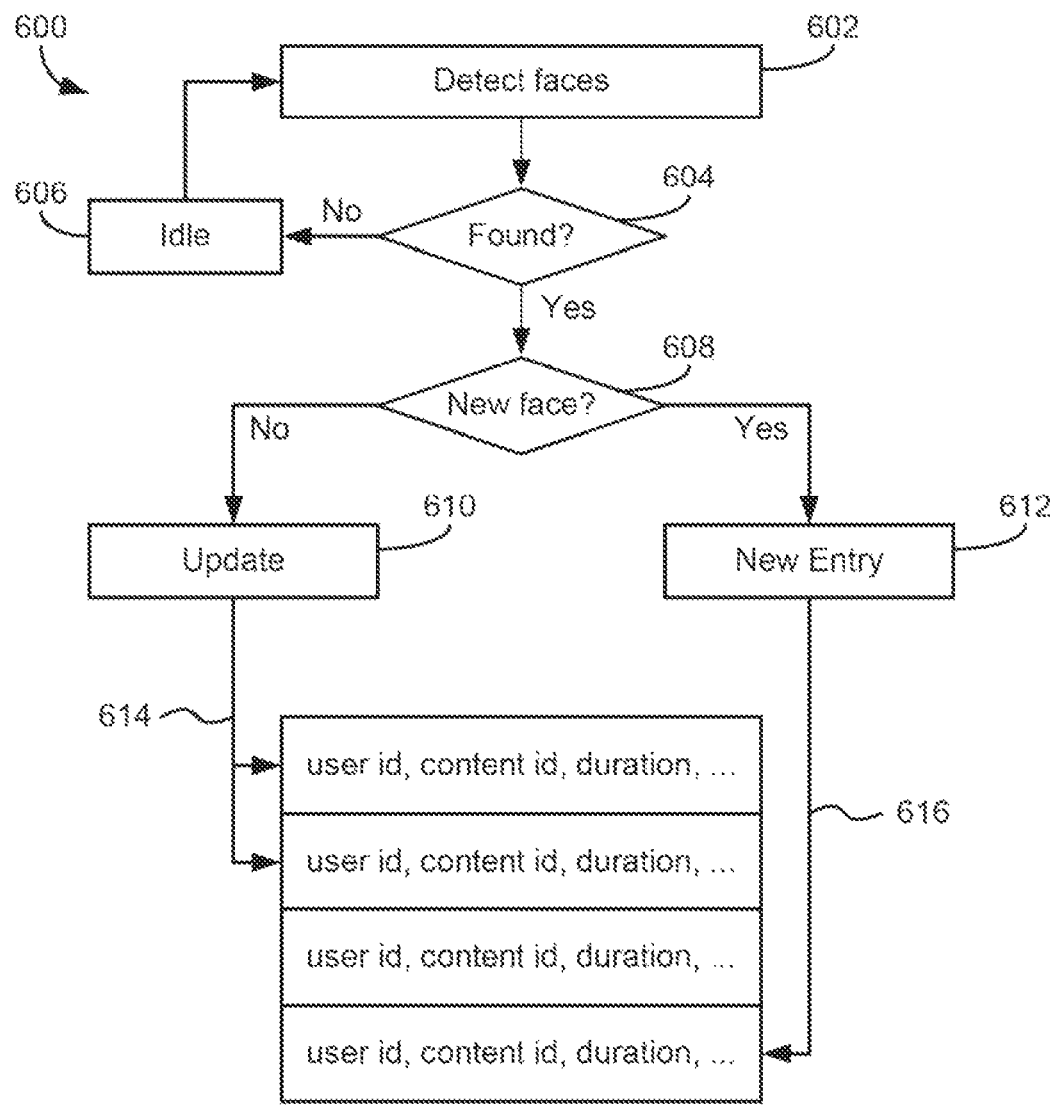
FIG. 6 is an example of a multiple user system in accordance with a described implementation.
Figure 9:
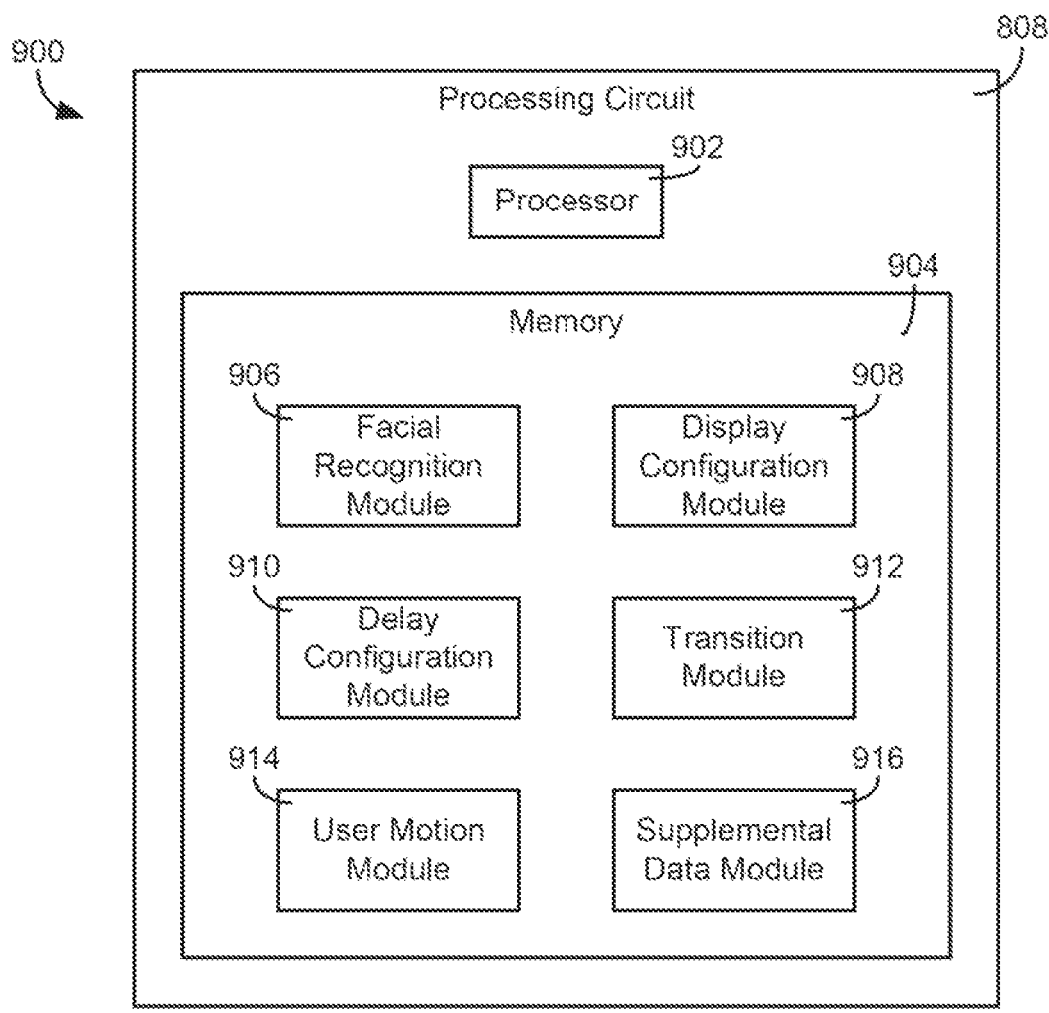
FIG. 9 is an example of the processing circuit as shown in FIG. 8.

FIG. 5 is an example 500 of a single user system in accordance with a described implementation, while FIG. 6 is an example 600 of a multiple user system in accordance with a described implementation. The system may provide seamless continuous playback of content across multiple devices or modalities based on the facial recognition of the user. The system may use temporary user information to follow the user from one device to another. The system may include a repository that stores user activity. The system may also include multiple network-connected devices with facial recognition systems, as shown in FIG. 9. Each device may report temporary user viewing information to the repository. The temporary user viewing information may be used to facilitate the seamless continuous playback.

The system shown in FIGS. 5 and 6 may also include a table of current sources/programs that may be viewed or have been viewed by a number of users. The table may be stored in an "Active Entity" table. The "active entity" table may include user information, such as an email account, avatar, or another unique identifier that is generated by the system for a particular image. The unique identifier may be maintained in a central repository and may always be the same for the same face. The table may also include the entity source, such as DVR (digital video recording), URL, etc. The table may include an entity identifier, such as a TMS identifier, or another identifier for the title, number, etc. of the content that is being viewed. The table may also include an interval of time, such as the starting point, ending point, duration (e.g., the last time the user was detected viewing the content), etc.

The system may also maintain a repository of images, faces, user information, etc. The repository may be local, such as a facial recognition database being local to the user's location (dwelling). In other implementations, the repository may be global, such as a company maintains the database.

In FIG. 5, an example 500 of a single user system is shown in accordance with a described implementation. At 502, the user powers on the device, resumes the content, etc. The user may log into the device (such as a set top box) using an account, such as an email account.

At 504, the system verifies whether the user is recognized. If the face is not recognized, then, at 506, the system obtains multiple images of the user to associate the account with the user's face.

If the face is recognized, then the set up of the account is complete and the user may begin viewing the content. The system recognizes the user using facial recognition. At 508, the system may create an entry into the active entity table using the content information, the user identifier, the duration, etc. The duration may be continuously updated by the system as long as the system recognizes the face. Once the user stops viewing the content, as detected by the system, then the duration is not updated. The system will keep the last time the user was detected as viewing the content. In some implementations, if the user is detected as viewing the content after an interval of time of not viewing the content, then the system may present a message (e.g., an overlay message), asking if the user would like to view the content from where the user was detected as not viewing or from where the current point is in the content regardless of the detection by the system.

At 510, a second device is powered on or content is resumed on the second device. The system may then monitor the content, at 512, on both devices and ask the user whether the user wants to continue viewing the content from the first device.

In FIG. 6, an example 600 of a multiple user system is shown in accordance with a described implementation. The system may utilize voting techniques when multiple users are present at the same time to determine the content to be presented on the device.

At 602, the system verifies whether the image/face is recognized. The system searches for the face at 604. If the system cannot find the face, then at 606, the system may idle for an interval of time, e.g., 5 seconds, before it verifies whether the image/face is recognized. If the face is verified as a face, then the system determines at 608 if it is a new face. For example, the system may already have detected a first user viewing the content and at 608 determines whether a new face has been detected viewing the content.

If the system determines that the image/face is new, then at 612, the system allocates an identifier to the new user and associates it with the user's image/face. An entry is provided to the active entity table with the identifier, content identifier, etc. If the system determines that the image/face is not new, then at 610, the system updates the duration for all of the detected users. At 614, the system updates all information related to that user. Also, at 616, the new user is entered into the active entity table. The system may also detect when the user(s) stops viewing the content, and stops updating the duration accordingly.

If the user resumes viewing the content on another device, then the system detects the user's face, shows all active entries associated with the user's identifier. For example, the active entries may be ordered, starting from most recently viewed content. The user selects which content to view and the system may begin playing the selected content. If the other user finishes the content, the active table entry associated with this user is removed from the table meaning the content for each user is updated independently even when the users are viewing the same content.

Figure 7:
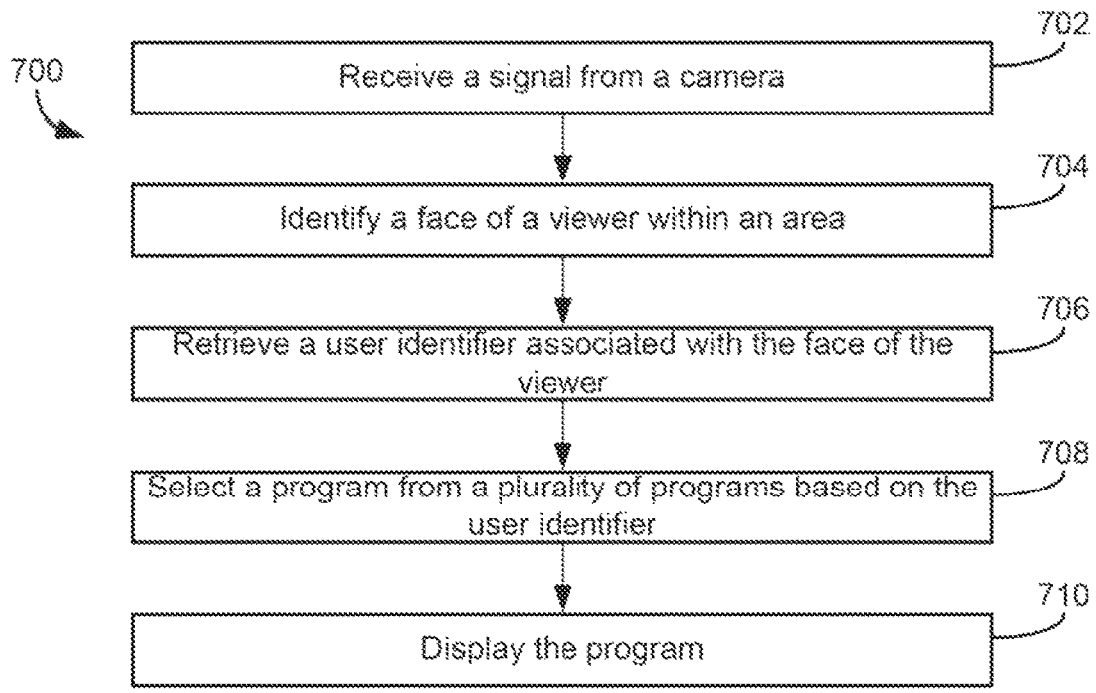
FIG. 7 is an example of a flow diagram of a method in accordance with a described implementation.

FIG. 7 is an example of a flow diagram of a method in accordance with a described implementation. Method 700 may be performed in any order. In some implementations, the steps of method 700 may be performed at the same time. Method 700 may be performed online or offline. Method 700 may be implanted in a variety of systems, such as the system described above and/or system 600 of FIG. 6.

At block 702 of method 700, a signal may be received by a camera. In some implementations, the signal from the camera may include an image. In some implementations, location information may be extracted from the image to determine location information to associate with the received image. For example, the system may use the location information to build in an appropriate time delay between devices.

The camera may include any device capable of capturing images including, but not limited to, a digital camera, a mobile computing device, a laptop computer, a video game console, a media player, etc. The signal from the camera may be provided to a server. The server may store the signal as an image.

At block 704, a face of a viewer within an area is identified. The face of the viewer may be identified from a plurality of viewers. For example, the device may include a number of different viewer profiles and the system may determine which viewer is appropriate. The face of the viewer may be compared with a stored image or the face of the viewer may be determined (e.g., detected and recognized) using a variety of facial recognition techniques. In an example, characteristics or assumptions about a face may be used by a facial recognition module to identify a face of a viewer within an area.

The user position may be inferred relative to the camera and a determination may be made as to whether the user is interacting with the camera. The user position may include a facing direction of the user relative to the camera. For example, the user may be near the camera, but may not be interacting with the device, such as reading a book, preparing dinner, etc. In some implementations, the viewer may set up preferences to provide content regardless of any interaction with the camera.

The area may include any dimension around the device. For example, the area may include a predetermined region around the device, such as the location (room) of the device. The area may be predetermined by the system, e.g., the camera does a scan of the location where the device is located. In other implementations, the area may be predetermined by the user, e.g., the viewer sets the area for the camera to detect the viewer.

At block 706, a user identifier associated with the face of the viewer is retrieved. For example, a server may compare the face of the viewer to a stored user identifier. For example, the server may compare the received image of the viewer with a stored user identifier using various facial recognition techniques. The user identifier may be received from the device providing the content. The user identifier may also be synchronized across different devices in order for the system to quickly identify the viewer. In other implementations, the user identifier may be retrieved by the system when the user logs into the system.

At block 708, a program from a plurality of programs is selected based on the user identifier. The user identifier may also provide information related to content that was previously being viewed. Based on facial recognition, the system selects the program associated with the retrieved user identifier. In some implementations, based on facial recognition, the system may query the user regarding certain attributes of a program to narrow down a selection of programs.

The user identifier may also provide information such as time of day (e.g., programs that are most likely to be watched at a certain time), favorite programs, frequently viewed programs, related programs or content, etc. for content suggestion. The user identifier may also include information such as web page content, music, books, etc., that the user has interacted with so that the system may select or recommend a program from a plurality of programs. The system may also provide an electronic programming guide to the user based on the user identifier. For example, the user may want to visualize a set of programs, rather than have the system select a program. The user may select the program from, for example, a drop-down list of programs.

At block 710, the program is displayed. The program may be displayed upon a display area. The display area may include an interface that may be operated by touch, voice, input devices, etc. In another implementation, the displayed program may be provided to another device based on movement of the viewer. For example, if the viewer leaves the location of the device, powers on another device, etc., the program will be displayed to the viewer at the location or the other device, respectively. In another implementation, the program may be stored in a memory along with an interval of time. The interval of time may include a segment of the program that is stopped or paused. For example, the system may be configured to retrieve the segment of time to determine where to begin the content if/when the viewer makes a transition to another location, device, etc.

Figure 8:
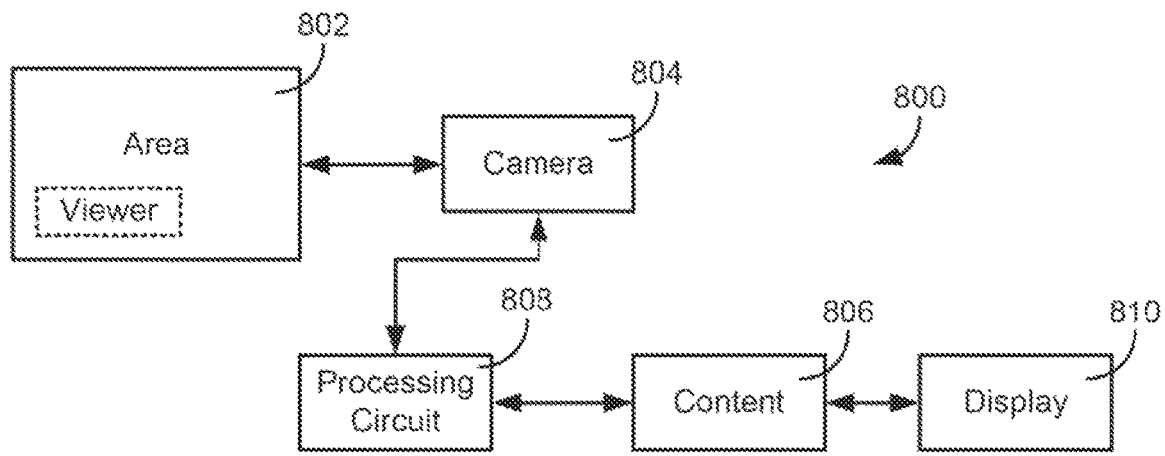
FIG. 8 is an example of a system of the method in accordance with a described implementation.

FIG. 8 is an example of a system of the method in accordance with a described implementation. In a brief overview, system 800 includes area 802, camera 804, content 806, processing circuit 808 and display 810.

Area 802 includes the region of interest to detect the viewer. For example, the region of interest may include the room that the device is placed. In another example, the region of interest may include the viewer's actual eyes, such as when the viewer is not interacting with the content, although the content is playing.

Camera 804 includes the component used to detect the region of interest. Camera 804 also is used to capture the face of the viewer, e.g., within the region of interest, whether the viewer is interacting with the content, etc. Camera 804 may provide the image that has been captured to processing circuit 808.

Processing circuit 808 may include a processor and a memory for storing or retrieving the image and other related information from the device, such as a user identifier, cookie, device identifier, etc. Processing circuit 808 may provide the information as content 806 to display 810.

FIG. 9 is an example of the processing circuit as shown in FIG. 8. Processing circuit may implement the features and operations described in FIGS. 1-8. Other architectures are possible, including architectures with more or fewer components. Processing circuit 808 may include processor 902 and memory 904. Memory 904 may include facial recognition module 906, display configuration module 908, delay configuration module 910, transition module 912, user motion module 914, and supplemental data module 916.

Processor 902 may process instructions for execution within the device, including instructions stored in memory 904, which may retrieve information from display configuration module 908 to display content on the device.

Memory 904 may store information within the device. Memory 904 may include a computer-readable memory. In another implementation, memory 904 may include a non-volatile memory unit or volatile memory unit.

Facial recognition module 906 may communicate with an imaging unit to receive an image of a user. Facial recognition module 906 may use a variety of facial recognition techniques to create a user, match the image with a stored user, etc., by determining the coordinates of the face. The image along with the user identifier may be generated by the facial recognition module 906 using a facial recognition algorithm, an optical character recognition algorithm (for specifying the portion of the image to be extracted), etc.

Display configuration module 908 may retrieve information or content from processor 902. Display configuration module 908 may be coupled to a display, which may include a thin-film transistor display, organic light emitting diode display, or any other appropriate display configuration. Display configuration module 908 may include appropriate circuitry for providing a display that present graphical, textual and other content to a user.

Delay configuration module 910 may be configured to provide a delay within the content to allow an effective transition from device to device. Delay configuration module 910 may also be configured to provide user with the ability to configure the device to delay the providing of content. In some implementations, delay configuration module 910 communicates with facial recognition module 906 to determine when detection of the user has begun and when detection of the user has ended in order to implement the delay.

Transition module 912 may be configured to seamlessly transition the display of content from one device to another. The transition may occur by any appropriate mechanism. For example, the transition of the display of content from one device to another may occur by detection of the user. In another example, the transition of the display of content from one device to another may occur by the detection of powering on, off, etc. of the devices.

User motion module 914 may be integrated with facial recognition module 906. For example, user motion module 914 may detect when the user moves, starts interacting with the content, etc. User motion module 914 may provide information to facial recognition module 906 to retrieve information related to the user.

Supplemental data module 916 may include information related to the user, the device, the camera, etc. Supplemental data module 916 may be configured to enable processing circuit 808 to provide the appropriate content to the user at the device.

Implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is tangible.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for transitioning content, the system comprising:
   a memory;
   one or more sensors; and
   a hardware processor that, when executing computer executable instructions stored in the memory, is configured to:
   receive, from the one or more sensors, sensor data;
   determine that a face of a user is recognized based on the received sensor data;
   update a duration value based on the face of the user continuing to be present based on the sensor data while content is being output for presentation;
   after updating the duration value based on the face of the user continuing to be present based on the sensor data, cease to update the duration value based on the face of the user being determined to no longer be present based on the sensor data;
   after ceasing to update the duration value based on the face of the user being determined to no longer be present based on the sensor data, determine that the face of the user is present again based on the sensor data; and
   in response to determining that the face of the user is present again based on the sensor data, cause a message to be presented that provides an option for the user to view the content being output for presentation based on the duration value.

2. The system for transitioning content of claim 1, wherein the message provides a second option for continuing output of the content regardless of determining the face of the user is present again.

3. The system for transitioning content of claim 1, wherein the hardware processor that, when executing computer executable instructions, is further configured to:
   log the user into an account associated with the user.

4. The system for transitioning content of claim 1, wherein the message is presented as an overlay over the content.

5. The system for transitioning content of claim 1, wherein the hardware processor that, when executing computer executable instructions, is further configured to:
   restart output of the content based on the duration value in response to selection of the option for the user to view the content being output presentation based on the duration value.

6. The system for transitioning content of claim 1, wherein the hardware processor that, when executing computer executable instructions, is further configured to:
   creating an entry in an active entity table that includes: a user identifier; content information; and the duration value.

7. The system for transitioning content of claim 1, wherein the hardware processor that, when executing computer executable instructions, is further configured to:
   log a second user into a second account associated with the second user; and
   determine that a second face of the second user is not recognized based on the received sensor data.

8. The system for transitioning content of claim 7, wherein the hardware processor that, when executing computer executable instructions, is further configured to:
   store multiple images of the second user in association with the second account.

9. The system for transitioning content of claim 1, wherein sensor is a camera.

10. A method for transitioning content, the method comprising:
   receiving, from one or more sensors, sensor data;
   determining that a face of a user is recognized based on the received sensor data;
   updating a duration value based on the face of the user continuing to be present based on the sensor data while content is being output for presentation;
   after updating the duration value based on the face of the user continuing to be determined to be present based on the sensor data, ceasing to update the duration value based on the face of the user being determined to no longer be present based on the sensor data;
   after ceasing to update the duration value based on the face of the user being determined to no longer be present based on the sensor data, determining that the face of the user is present again based on the sensor data; and
   in response to determining that the face of the user is present again based on the sensor data, causing a message to be presented that provides an option for the user to view the content being output for presentation based on the duration value.

11. The method for transitioning content of claim 10, wherein the message provides a second option for continuing output of the content regardless of determining the face of the user is present again.

12. The method for transitioning content of claim 10, further comprising:
   logging the user into an account associated with the user.

13. The method for transitioning content of claim 10, wherein the message is presented as an overlay over the content.

14. The method for transitioning content of claim 10, further comprising:
   restarting output of the content based on the duration value in response to selection of the option for the user to view the content being output presentation based on the duration value.

15. The method for transitioning content of claim 10, further comprising:
   creating an entry in an active entity table that includes: a user identifier; content information; and the duration value.

16. The method for transitioning content of claim 10, further comprising:
   logging a second user into a second account associated with the second user; and
   determining that a second face of the second user is not recognized based on the received sensor data.

17. The method for transitioning content of claim 16, further comprising:
   storing multiple images of the second user in association with the second account.

18. A non-transitory computer-readable medium containing computer executable instructions that, when executed by a hardware processor, cause the hardware processor to perform a method for transitioning content, the method comprising:
   receiving, from one or more sensors, sensor data;
   determining that a face of a user is recognized based on the received sensor data;
   updating a duration value based on the face of the user continuing to be present based on the sensor data while content is being output for presentation;
   after updating the duration value based on the face of the user continuing to be determined to be present based on the sensor data, ceasing to update the duration value based on the face of the user being determined to no longer be present based on the sensor data;
   after ceasing to update the duration value based on the face of the user being determined to no longer be present based on the sensor data, determining that the face of the user is present again based on the sensor data; and
   in response to determining that the face of the user is present again based on the sensor data, causing a message to be presented that provides an option for the user to view the content being output for presentation based on the duration value.

19. The non-transitory computer-readable medium of claim 18, wherein the method further comprises:
   restarting output of the content based on the duration value in response to selection of the option for the user to view the content being output presentation based on the duration value.

20. The non-transitory computer-readable medium of claim 18, wherein the message provides a second option for continuing output of the content regardless of determining the face of the user is present again.

* * * * *